Oct. 5, 1954
H. N. McKINNON
2,690,817
CLASP BRAKE
Filed Nov. 9, 1951
2 Sheets-Sheet 1
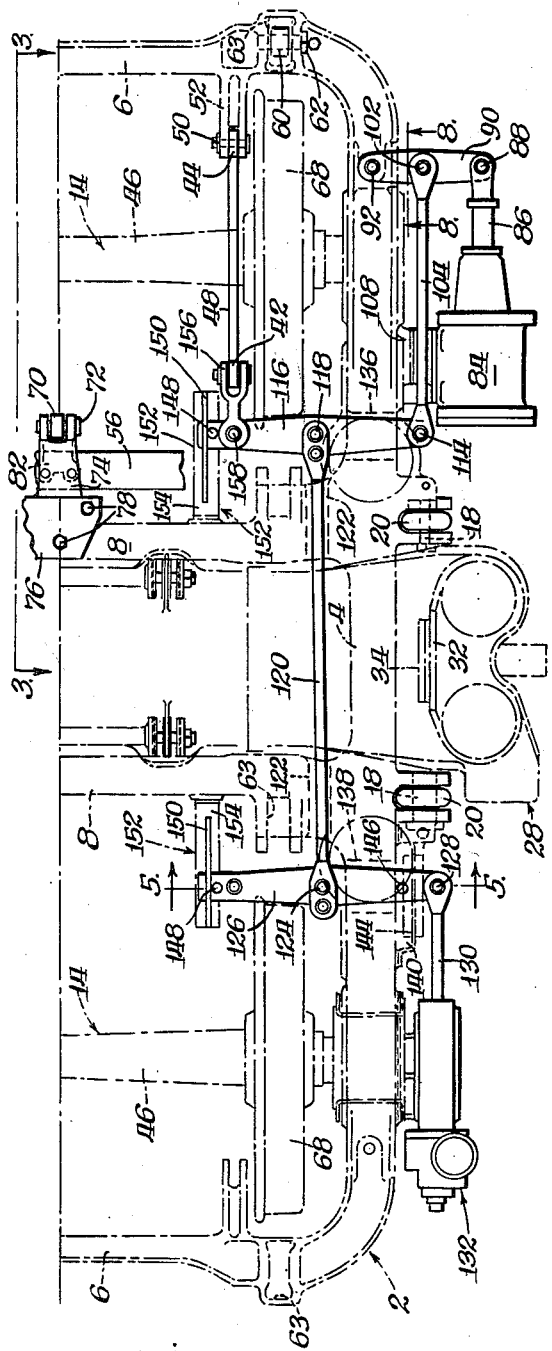
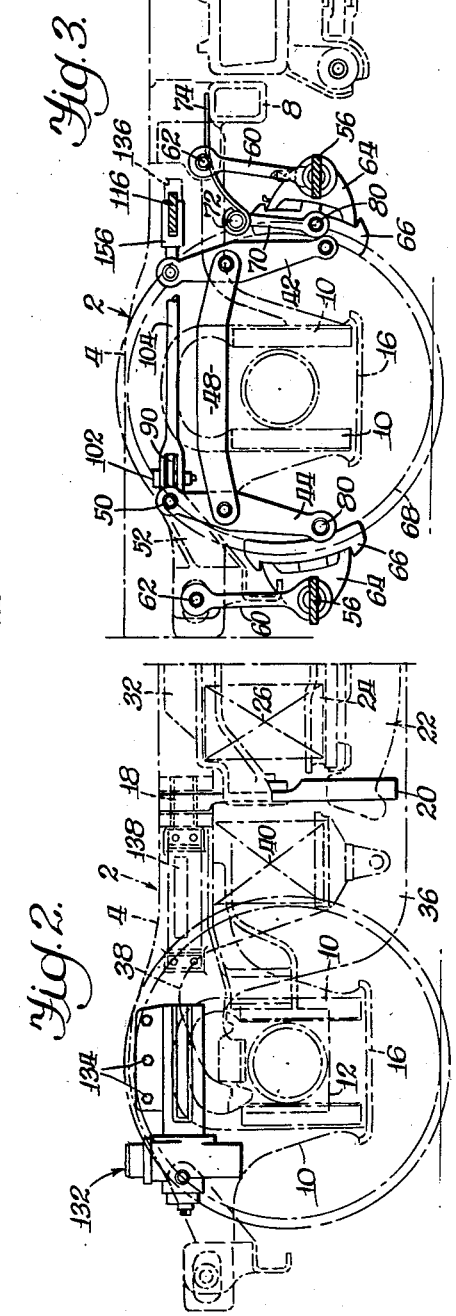
INVENTOR.
Herbert Neil McKinnon
BY
Atty.

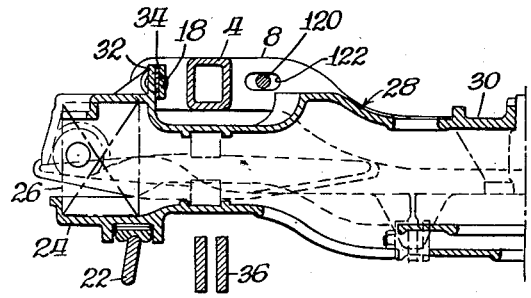
Fig. 4.
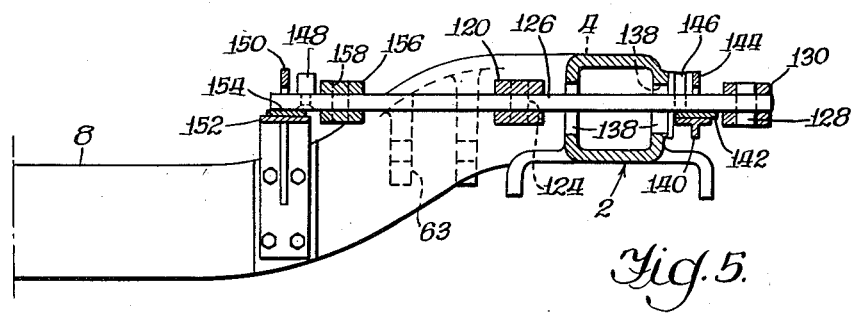
Fig. 5.
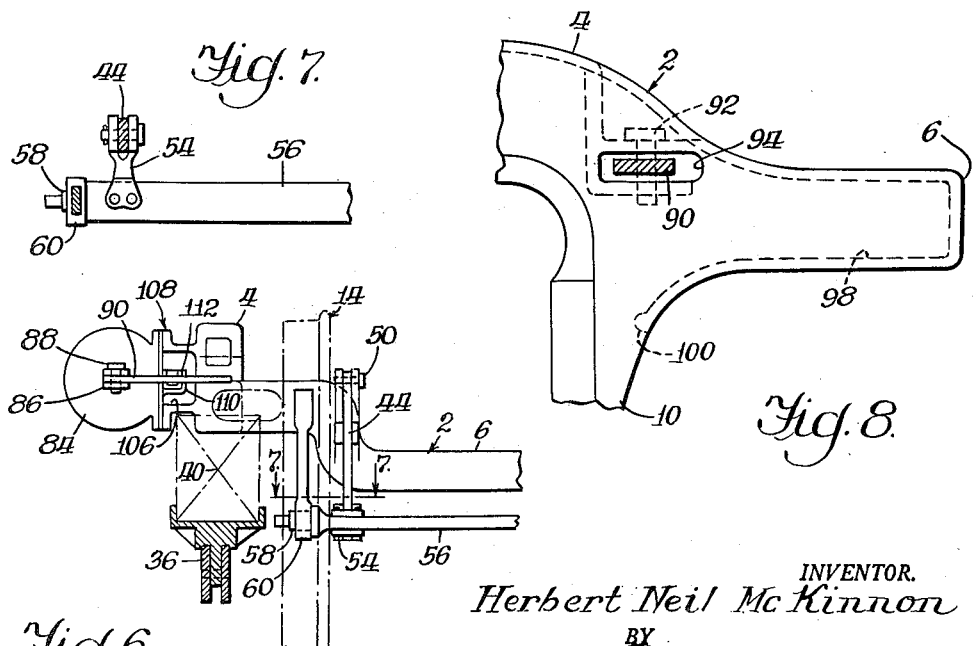
Fig. 7.
Fig. 8.
Fig. 6.
INVENTOR.
Herbert Neil McKinnon Patented Oct. 5, 1954

2,690,817

UNITED STATES PATENT OFFICE 2,690,817

CLASP BRAKE

Herbert Neil McKinnon, Potts Point, Sydney, New South Wales, Australia, assignor to American Steel Foundries, Chicago, Ill., a corporation of New Jersey Application November 9, 1951, Serial No. 255,587

9 Claims. (Cl. 188—56)

1

This invention relates to brakes and more particularly to a clasp brake for railway passenger car trucks.

A primary object of the invention is to devise a novel, compact clasp brake particularly adapted for application to passenger car trucks in which the truck bolster is supported by swing hangers projecting outboardly of the truck frame.

A further object of the invention is to simplify the lever system which connects the brake shoes to their actuating power cylinder which is mounted on the truck frame in what is commonly known as a unit cylinder arrangement.

A further object of the invention is to simplify the brake system as well as the truck frame by disposing all of the actuating levers and their interconnecting pull rods in a common horizontal plane, the actuating levers being in turn connected by substantially vertical truck levers to the brake beams which carry the brake shoes.

The foregoing and other objects and advantages of the invention will become apparent from a consideration of the following specification and the accompanying drawings, wherein:

Figure 1 is a fragmentary top plan view of a railway car truck and brake arrangement embodying the invention, only one-half of the truck being shown, inasmuch as the truck and brake system are symmetrical about the longitudinal center line of the structure;

Figure 2 is a fragmentary side elevational view of the structure shown in Figure 1;

Figure 3 is a sectional view on the line 3—3 of Figure 1;

Figure 4 is a transverse vertical sectional view approximately bisecting the truck bolster;

Figure 5 is a sectional view on the line 5—5 of Figure 1;

Figure 6 is an end view taken from the right as shown in Figure 1;

Figure 7 is a sectional view on the line 7—7 of Figure 6, and

Figure 8 is an enlarged sectional view on the line 8—8 of Figure 1.

In each of said figures certain details may be omitted where more clearly seen in other views.

Describing the invention in detail, the truck structure, as distinguished from the brake system, is shown in phantom lines in Figures 1–6, to clarify the illustration, said truck structure comprising a truck frame generally designated 2, and comprising a side rail 4 at each side thereof connected to the side rail (not shown) at the opposite side of the truck by end rails 6 and spaced transoms 8. Each side rail 4 is provided

2 adjacent each end rail 6 with spaced pedestals 10, receiving therebetween a journal box 12 (Figure 2) of a conventional wheel and axle assembly generally designated 14, said pedestals being provided with the usual removable tie bar 16 underlying the journal box 12.

Each transom 8 affords pivotal support in the usual manner as at 18 for a swing hanger 20, the hangers being connected by a beam 22 which carries one end of a spring support 24. Each end of the member 24 supports springs 26, which in turn support one end of a bolster generally designated 28, said bolster having a center bearing 30 (Figure 4) adapted to support an associated car body (not shown). The bolster 28 is provided adjacent each end thereof with an upstanding lug 32, carrying a cushion 34, adapted to engage the side rail 4 to limit relative movement of the bolster laterally of the truck.

The truck structure also comprises an equalizer 36 at each side of the truck, said equalizer being supported by its upturned ends 38 (Figure 2) by the journal boxes 12, and carrying springs 40 which support the side rail 4 of the truck frame 2.

The brake system comprises live and dead truck levers 42 and 44 at opposite sides of each axle 46 of each wheel and axle assembly 14, said levers being interconnected by an over axle strap 48. The dead lever 44 is pivotally fulcrumed as at 50 to a bracket 52 on the adjacent end rail 6. The lower end of each truck lever is pivotally connected by a jaw 54 (Figures 6–8) to a brake beam 56 having a trunnion 58 at each end thereof supported by a hanger 60 pivotally mounted as at 62 within a complementary opening or slot 63 (Figure 1) of the truck frame 2. The trunnion 58 of the beam 56 also affords pivotal mounting for a brake head 64 (Figure 3) carrying a brake shoe 66 for engagement with the periphery of a wheel 68 of the related wheel and axle assembly 14.

As will be understood by consideration of Figures 1 and 6, only one end of each brake beam 56 is illustrated, and it will be understood that the beams extend across the truck to the opposite side thereof for connection to identical brake rigging associated with the opposite wheels (not shown). The outer beams 56, which are actuated by the dead levers 44, are partially supported thereby, inasmuch as the dead levers are fulcrumed at 50 to the frame brackets 52. The inner beams 56 which are actuated by the live levers 42 are preferably afforded additional support by a balance hanger 70 pivotally supported as at 72 by a flat balance spring 74 secured to the adjacent transom 8, as, for example, by a bracket 76 and screws 78 (Figure 1). The lower end of the hanger 70 is pivotally connected as at 80 (Figure 3) to a jaw 82 (Figure 1) substantially identical in form with the previously described jaws 54.

The truck levers 42 and 44 are actuated by a system of interconnected levers (hereinafter described) and a power cylinder device 84 comprising a piston rod 86 pivotally connected as at 88 to the outboard end of a dead cylinder lever 90, which is pivotally fulcrumed as at 92 (Figures 1 and 8) at its inboard end within a jaw or slot 94 of the side rail 4 adjacent the right end rail 6, as shown in Figure 1. It may be noted in this connection, that the bottom web 98 of the side rail is terminated as at 100 at the juncture thereof with the outer pedestal jaw 10 to afford access to the pin 92 during assembly and disassembly thereof with the lever 90.

The lever 90 is pivotally connected intermediate its ends as at 102 to a pull rod 104 which extends through a passage 106 (Figure 6) in a bracket 108 to which the power cylinder device 84 is removably secured as, for example, by bolt and nut assemblies (not shown). The bracket 108 is preferably provided with a jaw 110 supporting and guiding the rod 104 and the jaw is provided with a U-shaped wear plate 112. The opposite end of the pull rod 104 is pivotally connected as at 114 to the outboard end of a live auxiliary lever 116 which is pivotally connected as at 118 intermediate its ends to one end of a pull rod 120. This pull rod extends through complementary guide openings 122 (Figure 4) of the transoms 8 and is pivotally connected at 124 (Figure 1) at its opposite end to a dead auxiliary lever 126.

The outboard end of the dead auxiliary lever 126 is pivotally connected as at 128 to a pull rod 130, connected to a conventional automatic slack adjuster device 132 removably secured as at 134 (Figure 2) to the side rail 4, above the pedestals 10 at the end of the truck remote from the device 84.

The live auxiliary lever 116 extends through a guide slot 136 (Figure 3) of the side rail 4, and the dead auxiliary lever 126 extends through a similar guide slot 138 (Figures 2 and 5) of the side rail 4 and is supported adjacent its outboard end by a bracket 140 removably secured to the side rail 4 and carrying a wear plate 142. As best seen in Figures 1 and 5, the bracket 140 comprises a strap 144 overlying the dead auxiliary lever 126 to confine the same against excessive vertical movement, and the lever 126 is provided with an upstanding lug or pin 146 engageable with the strap 144 to limit outboard movement of the lever 126. The inboard end of the lever 126 is provided with a similar lug or pin 148 engageable with a strap 150 of a bracket 152 carrying a wear plate 154 affording support for the inboard end of the lever 126.

The inboard end of the live auxiliary lever 116 is provided with an identical bracket 152 having a strap 150 overlying the inboard end thereof and engageable with a lug or pin 148 thereof to limit inboard movement of said live lever 116, the bracket 152 carrying a wear plate 154 supporting the inboard end of said lever 116.

Each auxiliary lever 116 and 126 is pivotally connected to a link and clevis 156 affording a universal connection to the live lever 42 of the adjacent wheel and axle assembly 14, whereby the live auxiliary lever 116 actuates the brake shoes 66 at the right end of the truck as seen in Figure 1, and the dead auxiliary lever 126 actuates the brake shoes 66 at the left end of the truck as seen in that figure.

In actuation of the novel brake system, the piston rod 86 moves to the right, as shown in Figure 1, thereby rotating the dead cylinder lever 90 in a counterclockwise direction about its pivot point 92 pulling the rod 104 to the right. The rod 104 rotates the live auxiliary lever 116 in a counterclockwise direction about its pivot point 118 thereby actuating the associated live and dead levers 42 and 44, respectively, to clasp their related brake shoes 66 against opposite sides of the related wheel 68, whereupon the auxiliary lever 116 rotates in a counterclockwise direction about its pivotal connection at 152 pulling the rod 120 to the right, as seen in Figure 1, and rotating the dead auxiliary lever 126 in a clockwise direction about its pivot point 128. Thus the dead auxiliary lever 126 actuates the live and dead truck levers 42 and 44, respectively, associated with the wheel 68 at the left end of the truck, as shown in Figure 1.

It may be noted that the levers 90, 116 and 126, which may be designated as actuating levers, as distinguished from the truck levers 42 and 44, are disposed in a common substantially horizontal plane, and the pull rods 104 and 120, as well as the piston rod 86 are also disposed in that same plane, thereby simplifying the brake rigging and reducing to a minimum stresses at the pivotal connections between the levers and pull rods.

Furthermore, all of the brake system is preferably entirely disposed below the lever of the side rail 4 and is disposed between the vertical planes of the end rails 6 in a compact arrangement which has proved to be very practical from a viewpoint of space limitations.

I claim:

1. In a brake arrangement for a railway car truck; the combination of a truck, interconnected live and dead truck levers adjacent each end of the truck, a dead cylinder lever fulcrumed at the inboard end thereof to the truck, a dead auxiliary lever fulcrumed at its outboard end to the truck, an operative connection between an inboard end of the auxiliary lever and the live truck lever at one end of the truck, a live auxiliary lever having an operative connection at its inboard end to the live truck lever at the opposite end of the truck, a pull rod connecting the auxiliary levers intermediate their ends, a pull rod connecting the outboard end of the live auxiliary lever to the cylinder lever intermediate its ends, and means operatively connected to the outboard end of the cylinder lever for actuation thereof, all of said auxiliary and cylinder levers and both of said pull rods being disposed in a single substantially horizontal plane.

2. In a brake arrangement for a railway car truck; the combination of a truck, interconnected live and dead truck levers adjacent each end of the truck, a dead cylinder lever fulcrumed at the inboard end thereof to the truck, a dead auxiliary lever fulcrumed at its outboard end to the truck, an operative connection between an inboard end of the auxiliary lever and the live truck lever at one end of the truck, a live auxiliary lever having an operative connection at its inboard end to the live truck lever at the opposite end of the truck, a pull rod connecting the auxiliary levers intermediate their ends, a pull rod connecting the outboard end of the live auxiliary lever to the cylinder lever intermediate its ends, means operatively connected to the outboard end of the cylinder lever for actuation thereof, means adjacent the ends of the dead auxiliary lever for limiting inboard and outboard movement thereof, and other means for limiting inboard and outboard movement of the second mentioned pull rod.

3. In a brake arrangement; the combination of a railway car truck comprising a truck frame and spaced wheel and axle assemblies, a pair of live and dead truck levers at opposite sides of each assembly, an over axle strap interconnecting each pair of levers intermediate the ends thereof, brake shoe means operatively connected to the lower ends of said levers for braking engagement with said assemblies, and actuating means for the live truck levers comprising interconnected live and dead auxiliary levers connected at their inboard ends to the respective live truck levers, and a lever fulcrumed at its inboard end to the truck frame and having a connection intermediate its ends to the outboard end of the live auxiliary lever.

4. A brake arrangement, according to claim 3, wherein the truck frame is provided with a bracket through which the last mentioned connection extends, and a power cylinder device is mounted on said bracket and is operatively connected to the outboard end of the last mentioned lever.

5. In a brake arrangement, a railway car truck having a truck frame with spaced side rails and spaced transoms interconnecting said side rails, a pair of wheel and axle assemblies supporting said frame, live and dead truck levers at opposite sides of each assembly, an over axle strap interconnecting the levers of each assembly intermediate their ends, the dead truck levers being fulcrumed at their upper ends to the frame, brake means supported by the frame and operatively connected to the lower ends of said levers for decelerating rotation of said assemblies, live and dead auxiliary levers extending through slots in one of the side rails, means affording a fixed fulcrum for the outboard end of the dead auxiliary lever, a pull rod disposed inboardly of the side rail and interconnecting the auxiliary levers intermediate their ends, said pull rod extending through complementary guide openings of the transoms, means interconnecting the inboard ends of the auxiliary levers with respective live truck levers, and actuating means operatively connected to the outboard end of the live auxiliary lever.

6. A brake arrangement, according to claim 5, wherein the actuating means comprise a power cylinder device mounted on the outboard side of the side rail, a dead cylinder lever fulcrumed at its inboard end to the side rail, a pull rod pivotally interconnecting the outboard end of the live auxiliary lever to the cylinder lever intermediate its ends, and an operative connection between the device and the outboard end of the cylinder lever.

7. A brake arrangement, according to claim 5, wherein a bracket is mounted on the outboard side of the side rail and is provided with an internal jaw, and a power cylinder device is mounted on the outboard side of said bracket, and means are provided for interconnecting the device to the outboard end of the live auxiliary lever, said last mentioned means comprising a pull rod extending through said jaw and guidably supported thereby.

8. A brake arrangement, according to claim 5, wherein a dead cylinder lever is fulcrumed to the side rail and is operatively connected to the outboard end of the auxiliary lever, the dead cylinder lever and both auxiliary levers being bisected by a substantially horizontal plane which also bisects the pull rod.

9. In a brake arrangement for a railway car truck; the combination of a truck frame, spaced wheel and axle assemblies supporting said frame, a power cylinder device carried by said frame, a dead cylinder lever fulcrumed at its inboard end to the frame, a dead auxiliary lever fulcrumed at its outboard end to the frame, a live auxiliary lever operatively connected at its outboard end to the dead cylinder lever intermediate its ends, the outboard end of said cylinder lever being operatively connected to said device, means interconnecting the auxiliary levers intermediate their ends, and brake means for each assembly operatively connected to the inboard end of the adjacent auxiliary lever, all of said levers being disposed in a substantially horizontal plane and being received within complementary guide slots of the frame.

References Cited in the file of this patent

UNITED STATES PATENTS

| Number | Name | Date |
|---|---|---|
| 1,936,896 | Baselt | Nov. 28, 1933 |
| 1,985,288 | Hedgcock | Dec. 25, 1934 |
| 1,994,180 | Redford | Mar. 12, 1935 |
| 2,064,367 | Baselt | Dec. 15, 1936 |
| 2,149,496 | Baselt | Mar. 7, 1939 |